United States Patent

Micheli et al.

[11] Patent Number: 6,116,532
[45] Date of Patent: Sep. 12, 2000

[54] ARMATURE WINDING MACHINE WITH VIBRATION MEANS

[75] Inventors: Paul R. Micheli, Glen Ellyn, Ill.; Jack W. Savage, Centerville, Ohio

[73] Assignee: Geo. Stevens Manufacturing Co., Inc., Elk Grove Village, Ill.

[21] Appl. No.: 09/335,253

[22] Filed: Jun. 17, 1999

[51] Int. Cl.[7] .......................... B21C 47/02; B65H 81/06
[52] U.S. Cl. .................. 242/443; 242/433.4; 242/448; 29/596
[58] Field of Search ................ 242/433.4, 443, 242/447, 447.1, 448; 29/596

[56] References Cited

U.S. PATENT DOCUMENTS

| | | |
|---|---|---|
| 4,027,827 | 6/1977 | Biddison . |
| 4,047,293 | 9/1977 | Kieffer ............................ 29/596 X |
| 4,052,783 | 10/1977 | Shively . |
| 4,459,742 | 7/1984 | Banner . |
| 5,377,893 | 1/1995 | Saito . |

*Primary Examiner*—Donald P. Walsh
*Assistant Examiner*—Emmanuel M. Marcelo
*Attorney, Agent, or Firm*—Marshall, O'Toole, Gerstein, Murray & Borun

[57] ABSTRACT

An improved coil winding machine adapted to wind an armature form, the machine including a vibration source used to vibrate the form and the wire to effectively insure maximum loading of wire on the armature form.

10 Claims, 3 Drawing Sheets

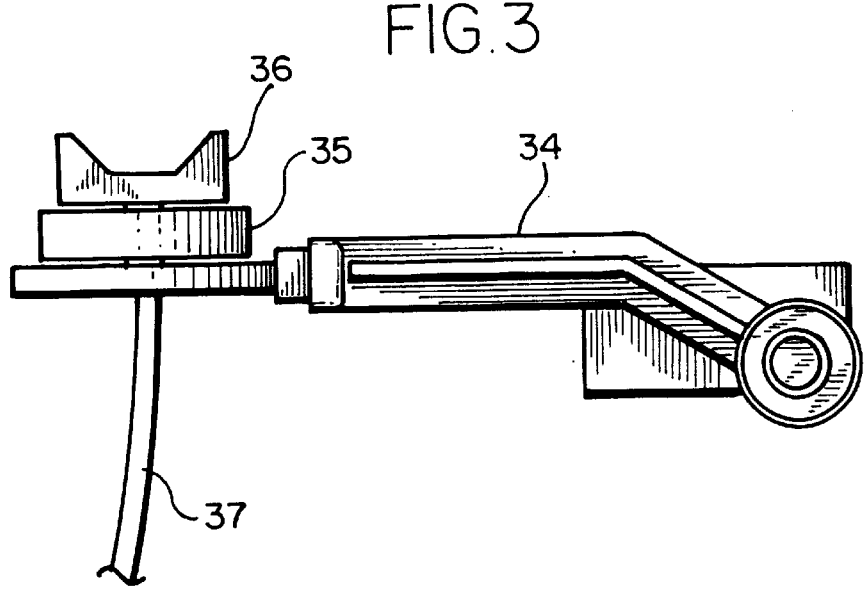
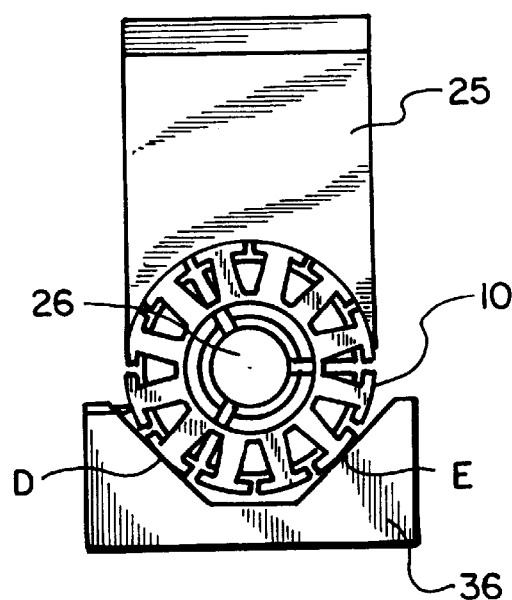
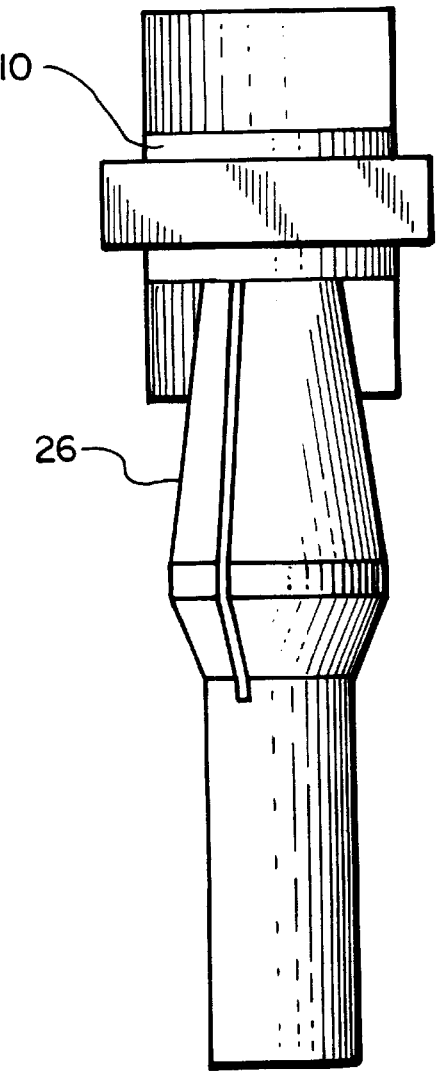

ARMATURE WINDING MACHINE WITH VIBRATION MEANS

BACKGROUND OF THE INVENTION

1. Field of the Invention

The present invention relates to an armature winding machine, and more particularly, an armature winding machine employing a piezoelectric excitation device for greater slot conductor cross-section yields by virtue of an induced vibration.

2. Background Art

The power obtainable or efficiency from an electric motor depends in part upon the cross-sectional area of the conductive wires located in the coil receiving slots of the motor's armature. Usually, the power obtainable may be optimized for an armature having coil receiving slots of a given cross-section by maximizing the percentage of the cross-section area of the slot that is filled with conductor. Accordingly, the present invention is concerned with an armature winding machine that utilizes a specialized technique to maximize the "slot fill" or cross-sectional area of conductive wire in the coil receiving slots of the armature being wound.

Experience has shown that the maximum slot fill (that is the cross-sectional area of conductive wiring within a slot divided by the cross-sectional area of the slot available to receive wire) has been found to be approximately 55%, with the remaining 45% of the slot cross-section area filled by gaps inherently caused by the wire and slot shapes. Armatures typically wound by fly winders have a slot fill sometimes as low as 40%. In some cases it has been found possible to achieve a slot fill in the order of 46% to 47% by exercising great care in the construction of the tooling. This high slot fill, while being highly desirable, is partly dependent upon the overall design of the armature.

The principle employed in the present invention wherein a vibratory technique is utilized to cause wires as being wound in a coil winding machine against armatures to seek the lowest level within armature slots can be understood by the following simple experiment: Into an empty cylindrical oatmeal container resting on a table, Rice Krispies® or similar dry cereal may be poured to a level even with the top of the carton. It is important that the container not be disturbed or shaken during the filling. Next, a top will be placed on the carton and then manually shaking the carton up and down striking the bottom of the container on the table for two or three dozen cycles.

At this time, if the top were removed, it would be easy to observe the Rice Krispies level would have lowered to a depth substantially below the starting level of the carton. It can be seen that before impacting or vibration, the carton was 100% full, but after impacting, was reduced to only 91% full, thus providing more room in the carton for additional Rice Krispies.

A search of the background art directed to the subject matter of the present invention conducted in the U.S. Patent and Trademark Office disclosed the following U.S. Letters Patent:

U.S. Pat. No. 4,027,827 issued Jun. 7, 1977 discloses connecting wires between armatures wound by an automatic armature winding machine clamped adjacent to commutator tangs with the finished wires hooked to the tangs of the wound armatures and the start wires looped about selected tangs of the armatures about to be wound.

U.S. Pat. No. 4,052,783 issued Oct. 11, 1977 teaches a technique for winding an armature and a shaft supporting core and a commutator having peripherally spaced tangs. The wire coils extend about a member supported for movement, when the member moves for twisting the wire to form a twisted wire loop on the member and transferring the twisted wire loop from the members to one of the tangs. The above steps are repeated to form a plurality of wire coils continuously interconnected by lead wires, each having a twisted wire loop connection with a corresponding tang.

U.S. Pat. No. 4,459,742 issued Jul. 17, 1984 discloses an armature winding machine method whose purpose is to increase the slot fill of the armatures wound on a flyer type armature winding machine of the type having inner and outer commutator shields. A tamper assembly is provided for engaging the coil ends immediately after they are wound. The tamper assembly is actuated by pushing tamper rods into engagement with coil ends. Thus, the coil sides would be pushed to locations more centrally of and deeper into the coil receiving slots than previously found available.

U.S. Pat. No. 5,377,893 issued Jan. 3, 1995 discloses an ultrasonic tape guide device wherein a video tape recorder employs fixed tape guides. These are activated ultrasonically by a piezoelectric ultrasonic vibrator to provide reduction in the amount of friction provided to a video tape crossing over the stationary fixed video tape guides.

A thorough review of the above-identified patents has concluded that none are believed to claim, teach, or disclose the particular novel combination of elements or functions set forth in the present invention. All of the cited patents are for different purposes or environments. Accordingly, it is the object of the present invention to provide an improved armature winding machine that greatly increases the amount of slot fill in armatures during the winding process.

SUMMARY OF THE INVENTION

The present invention is a substantial improvement to armature winding machines of the fly winder type. It has been felt for many years that armature or motor coils wound on a turn-by-turn basis at high speed could be wound to higher slot fills if the coils were vibrated during winding with a "G force" input. This core agitation would then permit optimal successive wire nesting in the core slots, getting higher potential wound slot fills resulting in greater efficiency of the units for which they were designed.

The nesting degree is influenced by the amplitude and frequency of vibration for a given winding speed.

It has been seen that rapid turn-by-turn winding subjects the conductor wire as utilized in armature windings to varying tensions which lead to successive slot wires not entering their slots in a parallel form to any previously wound wires. This leads to successive wires not drifting to the lowest zone of the slot due to friction coupling between themselves and any previously wound wires.

Successive wires can then climb over a neighbor in their traverse through a slot leaving the additional unfilled slot area as a result. This problem of friction coupling and wire crossing greatly reduces the gross slot area available for installing conductive wire. Generally, in the present invention it is the intent that a new winding technique be disclosed which will place the coil being wound under suitable vibration at an appropriate amplitude and frequency. Such cores stimulated with vibrational energy will prevent wires from hanging up on previous wires by nullifying any friction coupling and greatly reducing the tendency for climbing between adjacent wires. All wires will then tend to naturally float or descend to the lowest slot zone minimizing unused gross slot area. The vibrating coil being wound becomes a virtual fluidized bed wire receiver giving greater slot fill winding capability.

It has been found that standing waves set up on a wire being wound from the core excitation will enhance the nullification of friction coupling. It has been found that optimal fluidizing winding for different coil and wire sizes is a function of the vibrational energy frequency and amplitude.

The present invention constitutes a substantial improvement over armature winding machines of the fly winder type like those manufactured by Geo. Stevens Manufacturing Co., Inc. and particularly their model 47.

In such fly winder type of armature winding machines, the wire guide or stylus rotates at a set speed carrying the wire from a supply spool located at the rear of the machine. In the usual operation, an armature having a multiple slot configuration is adapted for having its wire positioned within the slots.

This armature is held in place in the machine by a chuck and collet assembly and as the wire stylus rotates around the armature, the wire is deflected into opposing slots by side deflector elements. The machine typically will supply a preset amount of turns of wire and then stop. The collet is then manually indexed to a next position which aligns the next pair of slots for application of wiring into the slots.

In the present application, an armature cradle is provided which contacts the armature at two, or more, points. Connected to the cradle is a piezoelectric shaker element which imparts mechanically induced vibration through the cradle into the armature and tooling of the machine. This vibrational energy supplied represents the natural frequency of the wire stylus. Thus, the vibration creates a sympathetic ringing of the supported wire. Suitable commercial power supplies and a commercially available audio generator are utilized to drive the piezoelectric activator element. The frequencies of the audio generator output are typically in the range from 10 hertz to 1,000 hertz and are selected to match the natural frequency of the stylus. The amplitude of the supplied sine wave is then on the order of 5 volts peak to peak.

It has been found that from the utilization of such techniques there is usually less slot filled, providing more remaining or reusable slot area or a lesser wound coil length from more compacted end turns and less wire weight from the shorter mean end turn path. Such results provide economic advantage in that the design can be reconfigured for greater slot conductor cross-section yielding much higher operating efficiency and/or more power output per package size. Inversely, it is possible that a given design could be reconfigured for the same efficiency and power output in a smaller package or reduction of size.

Obviously, a direct economic advantage stems from the latter in that for a given design requiring less conductor cost per unit depends on the physical aspect of the given design. Improved designs with lower ratios of core length to mean end turn path will save some substantial percentage in wire weight than those designs with the higher ratio because the short wire length aspect armature has a greater percent of its conductor length or weight invested in its end turns versus its slots. The present process substantially shortens the length of end turns but not the length of the slot conductors themselves.

The invention described herein may be used to produce armatures optimized to have a slot fill much greater than that found in the prior art. Thus, the present invention may be employed to achieve a maximum possible slot fill. Such additional slot fill enables production of significantly more compact electric motors having a higher power to armature diameter ratio than was previously possible using conventional type automatic armature winding machines.

BRIEF DESCRIPTION OF THE DRAWINGS

A preferred embodiment of the present invention will be described in detail with reference to the accompanying drawings wherein:

FIG. 3 is a top view of a portion of the improved mechanism of the present invention.

FIG. 4 is a top view of the yoke mechanisms and armature as utilized in the present invention.

FIG. 5 is a side view of the armature support mechanism as utilized in the present invention.

Similar numbers are used throughout all figures for similar elements.

DETAILED DESCRIPTION OF THE PREFERRED EMBODIMENTS

Figure 1:
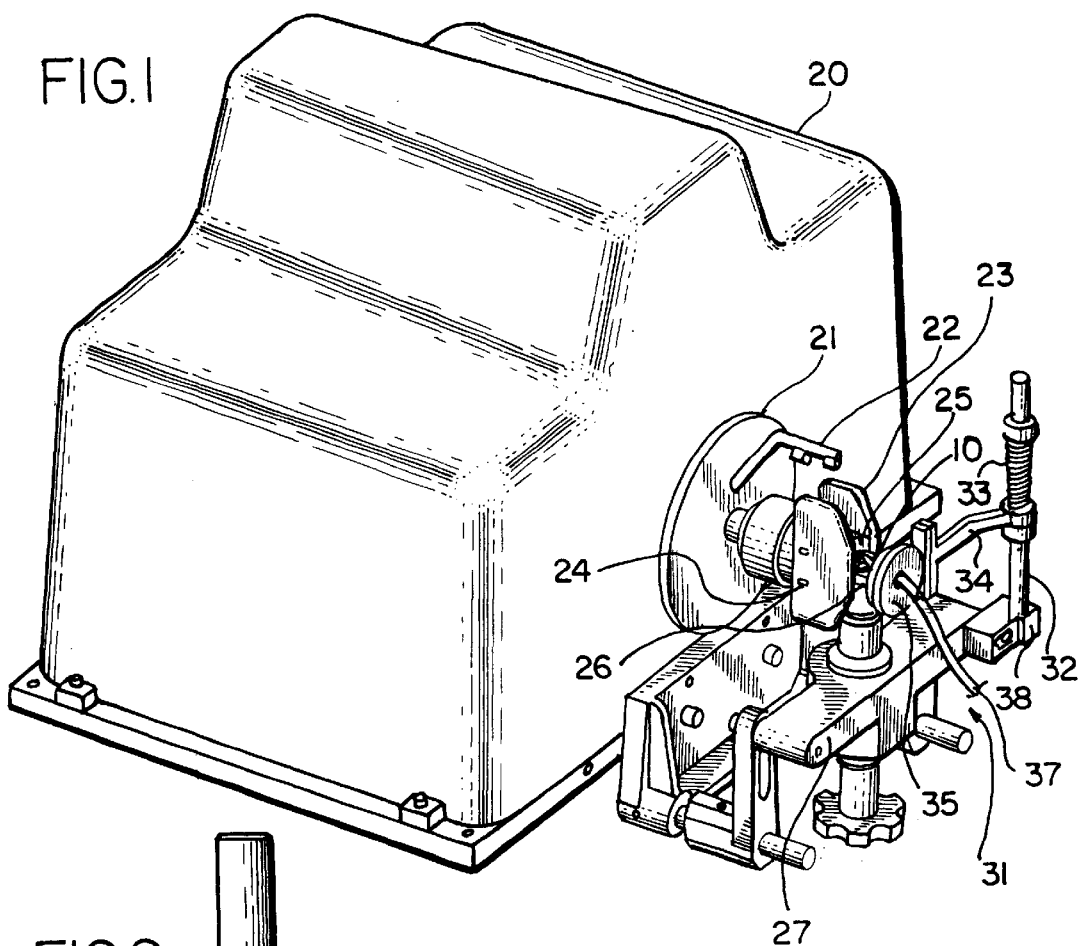
FIG. 1 is a perspective of a coil winding machine employing the improvements in accordance with the present invention.

Referring first to FIG. 1, it is shown that the present invention, which consists of a vibratory assembly 31, has been attached to a type 47, or similar, coil winding machine like that manufactured by Geo. Stevens Manufacturing Co., Inc. It should be noted that while the invention has been satisfactorily applied to a particular model of coil winder, its design and techniques might be applied to a large variety of existing coil winding machines, or even new coil winding machines could be designed to specifically incorporate the teachings of the present invention therewith.

Looking at FIG. 1, it must be understood that in addition to the housing 20, the flyer wheel 21, and flyer 22 are normally considered part of such coil winding machines. Likewise, deflectors 23 and 24, which are utilized during the coil winding operation, are also normally part of such coil winding machines. An armature 10, not part of the machine but shown by way of example, is shown mounted on collet 26, which is normally supplied with typical coil winding machines.

Figure 2:
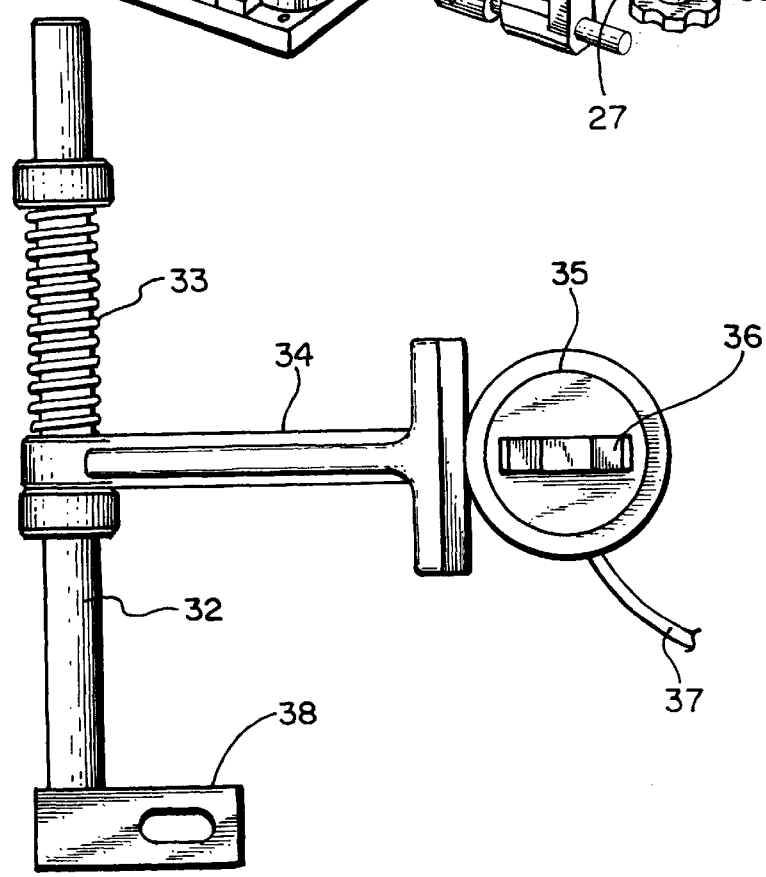
FIG. 2 is a side view of a portion of the improved mechanism of the present invention.

Referring to FIGS. 1, 2, and 3, the vibrator assembly 31, in accordance with the teachings of the present invention, consists of a vibrator mounting bracket 38 which is attached to mounting bracket 27 which is a part of a traditional or typical coil winding machine.

Supported by mounting bracket 38 is vertical support member 32. A horizontal support member 34 extends from support 32 with its position being adjustable by virtue of spring coil 33 which is positioned about the vertical support 32. Attached to the end of the horizontal support arm, which facilitates its being placed adjacent to an armature to be treated in accordance with the present invention, is a driver 35 which has secured to the surface thereof vibrator coupler 36.

As can be readily seen in FIGS. 1, 2, and 3, the vibrator driver has a cable 37 connected thereto. This cable extends to a suitable power supply and audio generator which are not shown but which are commercially available which are utilized to drive the piezoelectric activator which forms the basis for vibrator driver 35.

It has been found that audio generators having outputs in the frequencies between the range of 10 hertz and 1,000 hertz can be utilized to match the natural frequency of the stylus or flyer. The amplitude of the supplied sine wave of the wire as vibrated by the vibrator mechanism in accordance with the present invention is on the order of 5 volts peak to peak.

Utilized in operation, an armature form 10 which is to be wound in accordance with the teachings of the present invention is positioned on top of collet 26 which includes a slit therein making it adjustable to various size openings of armatures suitable for winding in accordance with the present teachings.

Referring to FIG. 4, it can be seen that the armature positioned on top of collet 26 is placed in contact with armature chuck 25 and then in contact with the vibrator coupler 36 which is a portion of the vibrator assembly of the present invention.

Thus, it can be readily seen that audio frequency signals applied via cable 37 from an audio frequency generator will cause the vibrator coupler mechanism 34 to vibrate against armature 10 as well as the vibrations thereto also being induced through armature chuck 25 and to the flyer mechanism including flyer 22 and flyer wheel 21. It is through flyer 22 that wire from wire source located behind or within the housing 20 of the present coil winding machine is passed and extended downto in a back-and-forth direction in a manner well known to flyer type coil winding machines to the armature supported on collet 26. This vibration, that has been induced through vibrator coupler 36, starts mechanically induced vibration throughout the cradle and into the armature and tooling of the machine. The vibrational energy so supplied represents the natural frequency of the stylus or flyer. This vibration creates a sympathetic ringing of the supported wire.

It should be understood, by virtue of the vibration induced to the coil winding machine of the present invention, friction coupling and wire crossing in typical armature slots is greatly reduced, thus providing substantial additional space available for windings to reside.

As can be readily seen by reference to the foregoing, the method for achieving higher slot fill as disclosed herein consists of placing the wire being wound under suitable vibration with respect to amplitude and frequency. Thus, the wire being wound is alive with vibrational energy and will prevent the wound wire from hanging up on previously wound wire by nullifying friction coupling and greatly reducing tendencies for climbing. All wires will tend to naturally float to the lowest slot zone minimizing unused slot area.

As can be seen, the wire stylus, or flyer 22, is vibrated at its fundamentally frequency thus transferring this energy to the wire sympathetically, thereby causing the wire to become virtually fluidized as it enter the slot to the armature. Thus, a greater slot fill winding capability is achieved with the friction coupling as noted being nullified by the standing wave imparted to the wire.

Figure 6:
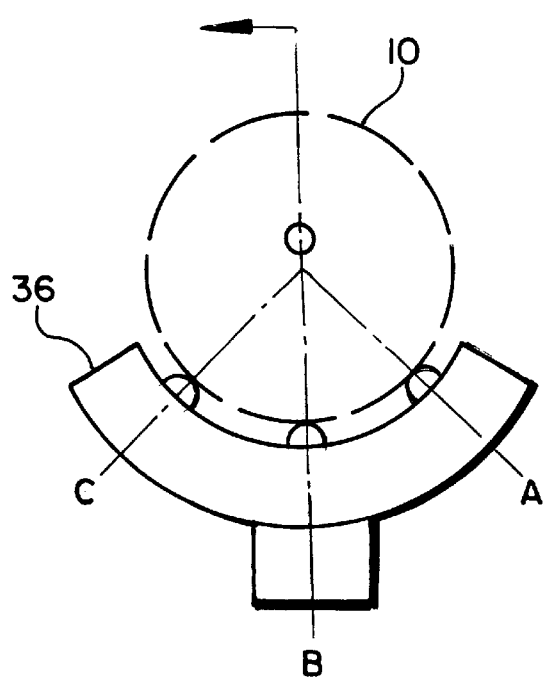
FIGS. 6, 7, 8, and 9 all show variations on the vibration yokes as utilized in the present invention.
Figure 7:
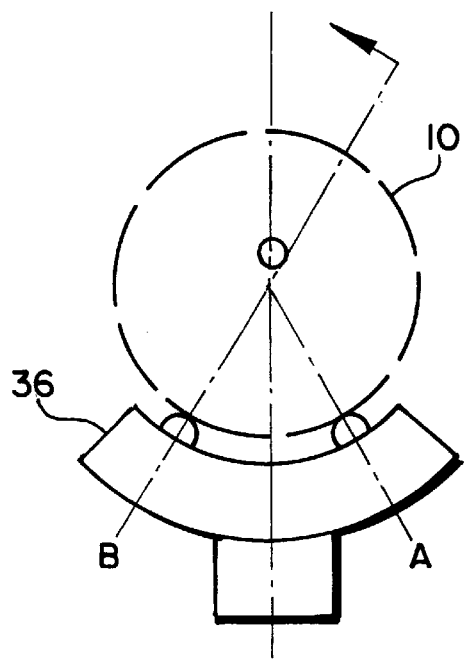

It has been found that other forms of the vibration coupler 36 differed from that as shown in FIG. 4 can be shown as demonstrated in FIGS. 6 and 7. In FIG. 4, it can be seen that the vibrator coupler has two points of contact. Let's refer to those two points as point D and point E. However, as an alternative, additional coupling points can be embraced along a similar access, as shown in FIG. 6, wherein vibration contact ribs or nodes could be positioned along lines AO, BO, and CO. Obviously, the quantity of these vibratory ribs is not limited to two or three. Normally, they would be positioned in the same place as shown in FIG. 8.

Figure 8:
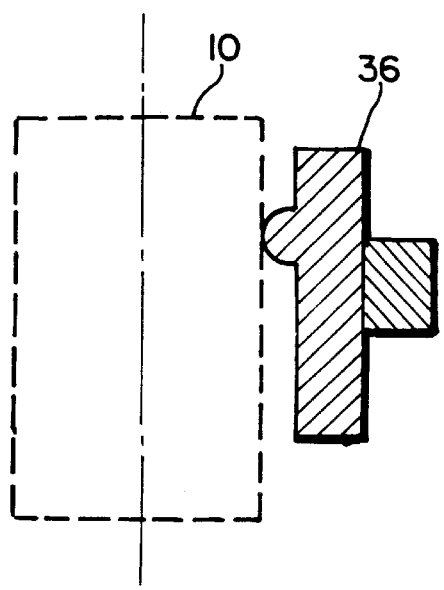
Figure 9:
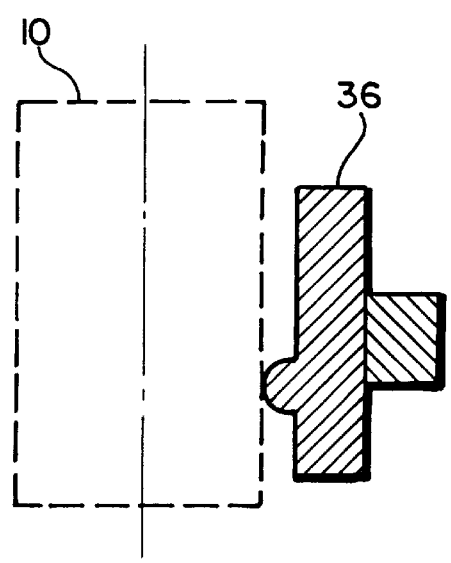

It is also possible that in some instances wherein the wiring on the armature, instead of being vertically positioned, may be skewed between the top and bottom of the armature, and then an arrangement like that shown in FIG. 7 might be employed wherein one or more ribs placed along lines AO would be positioned in the same plane as shown in 36, while additional ribs skewed along lines B and BO from line AC would have the vibratory ribs or nibs as shown in a different plane as shown in FIG. 9 substantially different than the plane of the vibrating ribs shown in FIG. 8.

It can be seen that such alternative coupling designs are not limited to what are shown specifically herein, but that numerous levels for the vibratory ribs can be achieved and various positions, all of which may provide a particular desirable form of contacts of the vibration coupling that might be required to meet the needs or design of a particular armature.

It can be seen from the foregoing that armatures wound on motor coils being on a turn-by-turn basis wound at high speeds can be wound to higher slot fills if the cores are vibrated with force input during winding. This core agitation would permit utmost successive wire nesting in the core slots giving higher potential wound slot fills and the nesting degree would seem to be influenced by the amplitude and frequency of vibration for a given winding speed.

A single basic embodiment of the present invention and a few minor variations thereon have been shown in the present disclosure. It will be obvious to those skilled in the art that numerous modifications may be made without departing from the spirit of the present invention which shall be limited only by the scope of the claims appended hereto.

What is claimed is:

1. A coil winding machine including a source of wire, an armature form adapted to receive wire from said wire source, means for supporting said armature form, a stylus for carrying said wire from said wire source to said armature form, the improvement comprising:

vibration means including a source of audio frequency energy;

vibration coupling means connected to said audio frequency source and in contact with said armature form;

vibrations from said vibration means coupled to said armature form and further coupled via said armature form to said armature support means and to said wire source;

whereby said vibrations insure maximum loading of wire on said armature form.

2. A coil winding machine as claimed in claim 1 wherein:

means for supporting said armature form include an armature chuck and an adjustable collet.

3. A coil winding machine as claimed in claim 1 wherein:

said vibration coupling means comprise a piezoelectric element connected to said audio frequency source, caused to vibrate at the frequency of said audio frequency energy.

4. A coil winding machine as claimed in claim 3 wherein:

said vibration coupling means further include said piezoelectric element and a yoke connected to said piezoelectric element configured to be in contact with said armature form.

5. A coil winding machine as claimed in claim 4 wherein:

said yoke includes at least one point in contact with said armature form.

6. A coil winding machine as claimed in claim 4 wherein:

said yoke includes a plurality of points in contact with said armature form.

7. A coil winding machine as claimed in claim 4 wherein:

said yoke means include first means for contacting said armature form in a first plane; and second means for contacting said armature form in a second plane.

8. A coil winding machine as claimed in claim 1 wherein:

said vibration means are supported on said coil winding machine to position said vibration means in contact with said armature form.

9. A coil winding machine as claimed in claim 1 wherein:

said vibration coupling means are supported by adjustable means connected to said coil winding machine to adjustably position said vibration coupling means in contact with said armature form.

10. A coil winding machine including a source of wire, an armature form adapted to receive wire from said wire source, an adjustable collet for supporting said armature form, a stylus for carrying said wire from said wire source to said armature form, the improvement comprising;

vibration means including a source of audio frequency energy connected to a piezoelectric element;

said vibration means mounted on said coil winding machine to selectively position said vibration coupling means in contact with said armature form;

vibration coupling means connected to said piezoelectric element in contact with said armature form;

whereby vibrations from said vibration coupling means insure maximum loading of wire on said armature form.

* * * * *